United States Patent Office 3,361,449
Patented Jan. 2, 1968

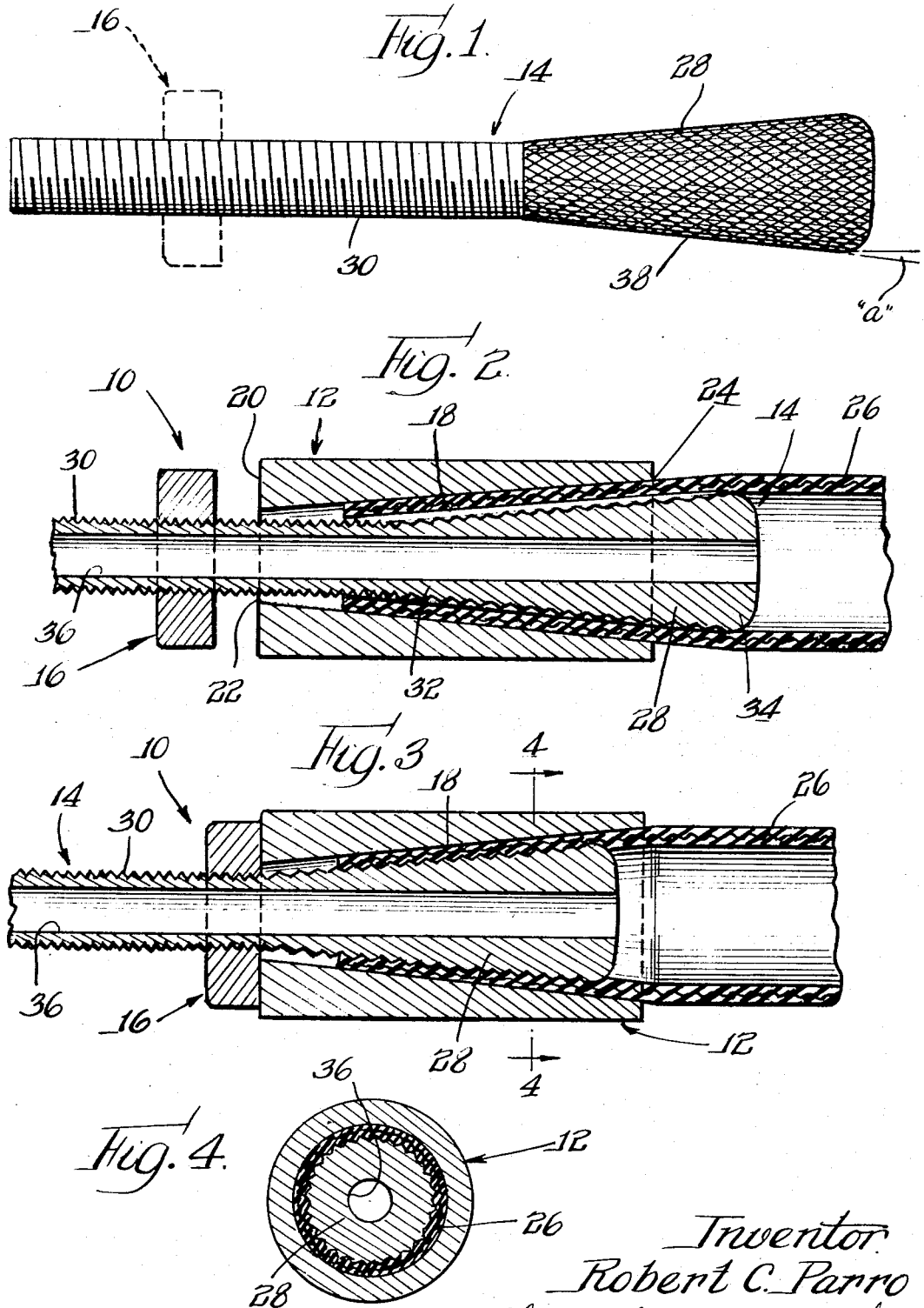

3,361,449
HYDRAULIC HOSE COUPLING
Robert C. Parro, 1105 Coach Road,
Homewood, Ill. 60430
Filed May 18, 1966, Ser. No. 550,991
2 Claims. (Cl. 285—245)

ABSTRACT OF THE DISCLOSURE

A hose coupling comprised of a telescoping sleeve and mandrel having cooperative tapering surfaces of substantial length, the tapered portion of the mandrel being shorter than the tapered bore of the sleeve to dispose the terminal end of the mandrel axially inwardly of the edge of the larger end of the sleeve in the hose connecting condition, the larger end of the mandrel having a substantially greater diameter than the smaller end of the bore for highly compressing the hose wall.

---

This invention relates generally to hose couplings and more particularly to couplings for making connections with rubber hose carrying hydraulic fluid under comparatively high pressure.

Modern hydraulic systems are adapted to operate at comparatively high fluid pressures; and while the flexible rubber hose which is customarily used to carry the fluid has been fabricated to resist pressure-induced damage, an increasingly frequent problem is leakage at the couplings for this hose.

Accordingly, an important object of the present invention is to provide a hose coupling which forms an exceptionally tight seal with the walls of a flexible hose.

Another object of the invention is to provide a coupling for fluid-conveying hose which has a large sealing area.

Still another object of the invention is to provide a hose coupling which is capable of developing a progressively increased sealing force.

And still another object of the invention is to provide a hose coupling which incorporates a minimum number of parts and which is both easy and economical to manufacture.

A further object of the invention is to provide a reusable hose coupling.

A still further object of the invention is to provide a hose coupling that is easy to manipulate in use.

And a still further object of the invention is to provide a hose coupling having self-aligning parts.

These and other objects and features of the invention will become more apparent from a consideration of the following descriptions.

In order that the principles of the invention may be readily understood, a single embodiment thereof, but to which the application is not to be restricted, is shown in the accompanying drawing wherein:

FIG. 1 is a side elevational view of a tubular mandrel employed in the coupling of the invention, a nut being suggested in position on the threaded end of the mandrel;

FIG. 2 is a side elevational view in central cross-section showing the mandrel of FIG. 1 loosely assembled with a sleeve member constructed in accord with the invention, a cooperating nut and one end of a fabric-reinforced rubber hose;

FIG. 3 is a view similar to the showing of FIG. 1 but illustrating the parts of the coupling clampingly engaging the end of the hose; and FIG. 4 is an end elevational view in section, taken substantially along the line 4—4 of FIG. 3.

Referring now in detail to the drawing, specifically to FIGS. 1 and 2, a hose coupling which is indicated generally by the reference numeral 10 is shown to comprise a sleeve member 12, a tubular mandrel 14 and a nut 16. The components of the coupling 10 are fabricated from strong, comparatively rigid materials, and ordinary carbon steel has proved useful as a material of fabrication.

The sleeve member 12 is fashioned with a smooth-walled tapering internal bore 18 and with an annular abutment surface 20 surrounding a small end 22 of the bore 18. The aperture defining the smaller end of the bore 22 is appropriately sized to pass one end of the mandrel 14, and the bore 18 tapers uniformly to a larger end 24 which defines a throat into which the mandrel and one end of a fabric-reinforced hose 26 may be inserted.

The mandrel 14 is intended to define an expansion member and is, therefore, provided with a tapering foot portion 28, foot portion 28 merging with an adjoining, externally threaded portion 30. The mandrel 14 is adapted to be inserted in the sleeve 12 with the threaded portion 30 at least partly extending beyond the abutment surface 20 where the exposed threads may receive the nut 16 thereon. In addition, the tapering foot portion 28 flares from a smaller end 32 at the confluence with threaded portion 30 to a larger end 34 at one terminus of the mandrel. Thus, the smaller ends of the foot portion 28 and the bore 18 are positioned closely with respect to each other, as are the comparatively larger ends of these two cooperating elements. Thus, the foot portion 28 and the bore 18 form a conical annular space therebetween for receipt of one end of the rubber hose 26. In order that the mandrel 14 may form a fluid conduit, both the threaded portion 30 and the foot portion 28 are perforated with an axial, internal passageway 36.

In accordance with the features of the present invention, the bore 18 and the foot portion 28 have confronting surfaces of frusto-conical shape. In further accord with the features of the invention, the bore 18 and the foot portion 28 have matching tapers; and in specific compliance with the illustrated embodiment, the tapers given these two parts are approximately 10% tapers. By a 10% taper is meant a flaring surface whose side forms an angle $a$ with a line drawn parallel to the axis of the bore or mandrel wherein the angle $a$ takes a tangent of about 0.10. In still further compliance with the features of the present invention, the external foot portion 28 is provided with gripping knurls 38 extending generally radially therefrom. While diamond knurling is shown in this latter regard, other types of knurling may be employed.

The nut 16 is provided with an internal thread matching the external thread on portion 30 of mandrel 14; and when the nut 16 is assembled on the extended region of portion 30, as shown in FIG. 2, the nut may be drawn into engagement with the abutment surface 20 of sleeve 12. Further turning of the nut onto the threaded portion 30 pushes the sleeve 12 over the mandrel forcibly converging the foot portion 28 of the mandrel and the smaller end 22 of the bore 18. This action serves to compress the material of the flexible hose 26 between the foot portion 28 and the defining wall of the bore 18, the knurling or foot portion 28 serving to prevent rotation of the mandrel with the nut 16. Lubrication of the bore 18 promotes this assembly. Suitable tightening of the nut 16 against the abutment surface 20 forms a fluid-tight coupling with the hose 26, according to the showing of FIGS. 3 and 4. After the coupling 10 is thus assembled to the end of hose 26, final connection is made to a suitable fitting in the fluid line by means of the exposed end of threaded portion 30.

Considering the clamping condition of the hose coupling 10 shown in FIGS. 3 and 4, it will be appreciated that the clamping pressure is distributed over a frusto-conical area defined by the region of the hose 26 which is situated between the foot portion 28 and the bore 18.

Furthermore, the amount of clamping force may be increased progressively because of the taperingly fitted relationship of the foot portion and the bore, the material of the hose 26 being theoretically compressible to zero thickness between these latter elements. The large clamping area and the large available clamping force cooperate to achieve an unusually fluid-tight coupling at the end of the hose 26. Moreover, adjustment of the clamping force is readily achieved by merely turning the nut 16.

As will be recognized, the coupling 10 is easily manufactured by simple machining operations; and economies in production are achieved because only three parts are employed. Furthermore, the sleeves in the mandrel are self-aligning in use because of the cooperating tapers. Moreover, the hose coupling of the invention may be reused because none of the parts are permanently deformed in assembly.

While a particular embodiment of the invention has been shown and described, it should be understood that the invention is not limited thereto since many modifications may be made. It is, therefore, contemplated to cover by the present application any such modifications as fall within the true spirit and scope of the appended claims.

What I claim is:

1. A hose coupling comprising: a sleeve member having a tapering frusto-conical bore therethrough and an annular abutment surface surrounding the smaller end of said bore; a tubular mandrel insertable in said bore and having an externally threaded portion at least partially extendable beyond said abutment surface, a tapering frusto-conical foot portion adjoining said threaded portion, and an internal passageway forming a fluid conduit through said threaded portion and said foot portion, said foot portion flaring from a smaller end at its confluence with said threaded portion to a larger end at one terminus of said mandrel, said larger end being substantially no greater in diameter than the inside diameter of the cooperating hose; and a nut threadable on the extended portion of said mandrel and engageable with said abutment surface in pulling said foot portion forcibly toward the smaller end of said bore upon aggressive engagement of said nut and mandrel, whereby to compress the material of a flexible hose situated between said foot portion and the defining wall of said bore forming a fluid-tight coupling with said hose, wherein said bore and said foot portion have matching tapers, wherein the larger end of said foot portion is of substantially greater diameter than the smaller end of said bore whereby to highly compress said hose, and wherein said foot portion and said sleeve member have lengths which are a multiple of the outside diameter of said hose whereby to establish a large clamping area on said hose, said foot portion being shorter than said bore so as to dispose said larger end foot portion axially inwardly of the edge of the larger end of said sleeve member in the hose compressing condition wherein the external surface of said foot portion has gripping knurls extending generally radially therefrom and wherein said bore is smooth walled.

2. A hose coupling according to claim 1 wherein said tapers are 10% tapers.

References Cited

UNITED STATES PATENTS

| 1,726,238 | 8/1929 | Pipher | 285—247 X |
| 2,205,347 | 6/1940 | Darling | 285—259 X |
| 2,248,576 | 7/1941 | McConnohie | 285—245 |
| 3,290,067 | 12/1966 | Buckle | 285—247 |

FOREIGN PATENTS

| 159,384 | 10/1954 | Australia. |
| 330,790 | 10/1935 | Italy. |

CARL W. TOMLIN, *Primary Examiner.*

THOMAS F. CALLAGHAN, *Examiner.*